US012083787B2

(12) United States Patent
Galletti

(10) Patent No.: US 12,083,787 B2
(45) Date of Patent: Sep. 10, 2024

(54) FLEXOGRAPHIC PRINT STATION WITH AN AUTOMATIC SYSTEM OF SUPPORT AND MOVEMENT OF AN INKING ROLLER FOR CHANGING THE INKING ROLLER

(71) Applicant: EDF EUROPE S.R.L., Argelato (IT)

(72) Inventor: Graziano Galletti, Bologna (IT)

(73) Assignee: EDF EUROPE S.R.L. (IT)

( * ) Notice: Subject to any disclaimer, the term of this patent is extended or adjusted under 35 U.S.C. 154(b) by 0 days.

(21) Appl. No.: 18/266,119

(22) PCT Filed: Dec. 20, 2021

(86) PCT No.: PCT/IB2021/062037
§ 371 (c)(1),
(2) Date: Jun. 8, 2023

(87) PCT Pub. No.: WO2022/137089
PCT Pub. Date: Jun. 30, 2022

(65) Prior Publication Data

US 2024/0034053 A1 Feb. 1, 2024

(30) Foreign Application Priority Data

Dec. 22, 2020 (IT) ........................ 102020000031847

(51) Int. Cl.
*B41F 5/24* (2006.01)
*B41F 31/00* (2006.01)

(52) U.S. Cl.
CPC .............. *B41F 31/004* (2013.01); *B41F 5/24* (2013.01)

(58) Field of Classification Search
None
See application file for complete search history.

(56) References Cited

FOREIGN PATENT DOCUMENTS

| | | | | |
|---|---|---|---|---|
| DE | 102005024502 | A1 | | 11/2006 |
| DE | 102019100307 | A1 | | 7/2020 |
| JP | 2001341276 | A | * | 12/2001 |

OTHER PUBLICATIONS

English translation of JP 2001-341276 A, to Igarashi et al., publication date Dec. 11, 2001. (Year: 2001).*

* cited by examiner

*Primary Examiner* — Leslie J Evanisko
(74) *Attorney, Agent, or Firm* — Endurance Law Group PLC

(57) ABSTRACT

A print station includes a chamber in which a cardboard sheet transits, two first support elements for an inking roller on internal faces of two opposite and facing walls of the chamber, at least two second support elements for the inking roller on the internal faces of the two walls, and a carriage positionable inside the chamber for restingly receiving the inking roller. The print station also includes an automatic system for moving and positioning the inking roller whether in a raised operating position, below a print roller; in a first lowered position at the first pair of support elements, for releasing or collecting the inking roller; in a second lowered position at the second pair of support elements for releasing or collecting the inking roller; or in a third lowered position at the carriage for releasing or collecting the inking roller.

9 Claims, 14 Drawing Sheets

FLEXOGRAPHIC PRINT STATION WITH AN AUTOMATIC SYSTEM OF SUPPORT AND MOVEMENT OF AN INKING ROLLER FOR CHANGING THE INKING ROLLER

FIELD OF THE INVENTION

The present invention relates to the technical sector relative to industrial systems for carrying out prints on articles, such as sheets of corrugated cardboard.

In particular, the present invention relates to industrial systems provided with a series of flexographic print stations which are arranged one following another and which are provided with print rollers (a print roller provided with clichés, and an upper counter-roller), through which the sheets of corrugated cardboard are fed and conveyed on which writings, images and/or logos are to be printed, and with a screen inking roller (known as an "anilox" roller), arranged below the print roller for the transfer of the ink to the print roller. In greater detail, the invention relates to a flexographic print station with an automatic system of support and movement of an inking roller for carrying out a change of the inking roller automatically with another inking roller.

DESCRIPTION OF THE PRIOR ART

In this particular technical sector, the sheets of corrugated cardboard are conveyed along a transport direction to cross a series of processing environments which are arranged one following the others, internally of each of which operations can be carried out, such as cutting the sheet and printing on it using a particular colour.

A relative flexographic print station is therefore included within each processing environment which is equipped with a relative print roller, provided with relative clichés for printing logos/writings or images on the cardboard sheet, and with a relative upper counter-roller, in which the print roller is supplied with an ink of a given colour for the printing operations by means of a screen inking roller, known, as mentioned above, as an "anilox" roller.

Each print station comprises a frame which is configured so as to define a chamber through which the sheets of corrugated cardboard transit and which comprises support means for supporting, and for activating in rotation, an inking roller, arranged transversally to the advancement direction of the sheets of corrugated cardboard, below and in contact with the print roller, and destined to be supplied with ink and to transfer the ink to the print roller.

The print station is predisposed, during the passage of a corrugated cardboard sheet on which the print has to be carried out, in order to activate in rotation the print roller as well as the inking roller in order to carry out the transfer of the ink from the inking roller to the print roller.

In the event that cleaning operations are to be carried out on a given inking roller present in a particular print station along the transport path of the sheets of corrugated cardboard, it is necessary to interrupt the supplying of the sheets, proceed to the demounting of the inking roller, to cleaning it and then remounting it.

These operations require, obviously, a certain amount of time, with a consequent prolonged machine down period of the whole system.

Also, at times it is necessary to move the inking roller present in a given print station into a different print station, situated upstream or downstream, so as to carry out the print with another colour, or to replace the inking roller present in a print station with another inking roller provided with a different weft of the screen, so as to realise, using the same colour, printing of writings, images and/or logos, with a different intensity or precision, for example prints of smaller or larger dimensions.

In all these cases too it is necessary to halt the machine for very long times, for the time necessary to be able to carry out the demounting, displacement and replacement operations of the inking rollers.

SUMMARY OF THE INVENTION

The aim of the present invention is therefore to provide a new flexographic print station with an automatic system of support and movement of an inking roller which enables carrying out rapid and automatic change of the inking roller effectively and rapidly, able to obviate the drawbacks mentioned in the foregoing.

The stated aim is attained with a flexographic print station with an automatic system of support and movement of an inking roller for changing the inking roller according to the contents of the claims.

BRIEF DESCRIPTION OF THE DRAWINGS

The characteristics of a preferred, but not exclusive, embodiment of the flexographic print station with an automatic system of support and movement of an inking roller for changing the inking roller of the present invention will be described in the following description with reference to the appended tables of drawings, in which.

DESCRIPTION OF THE PREFERRED EMBODIMENTS

Figure 1A:
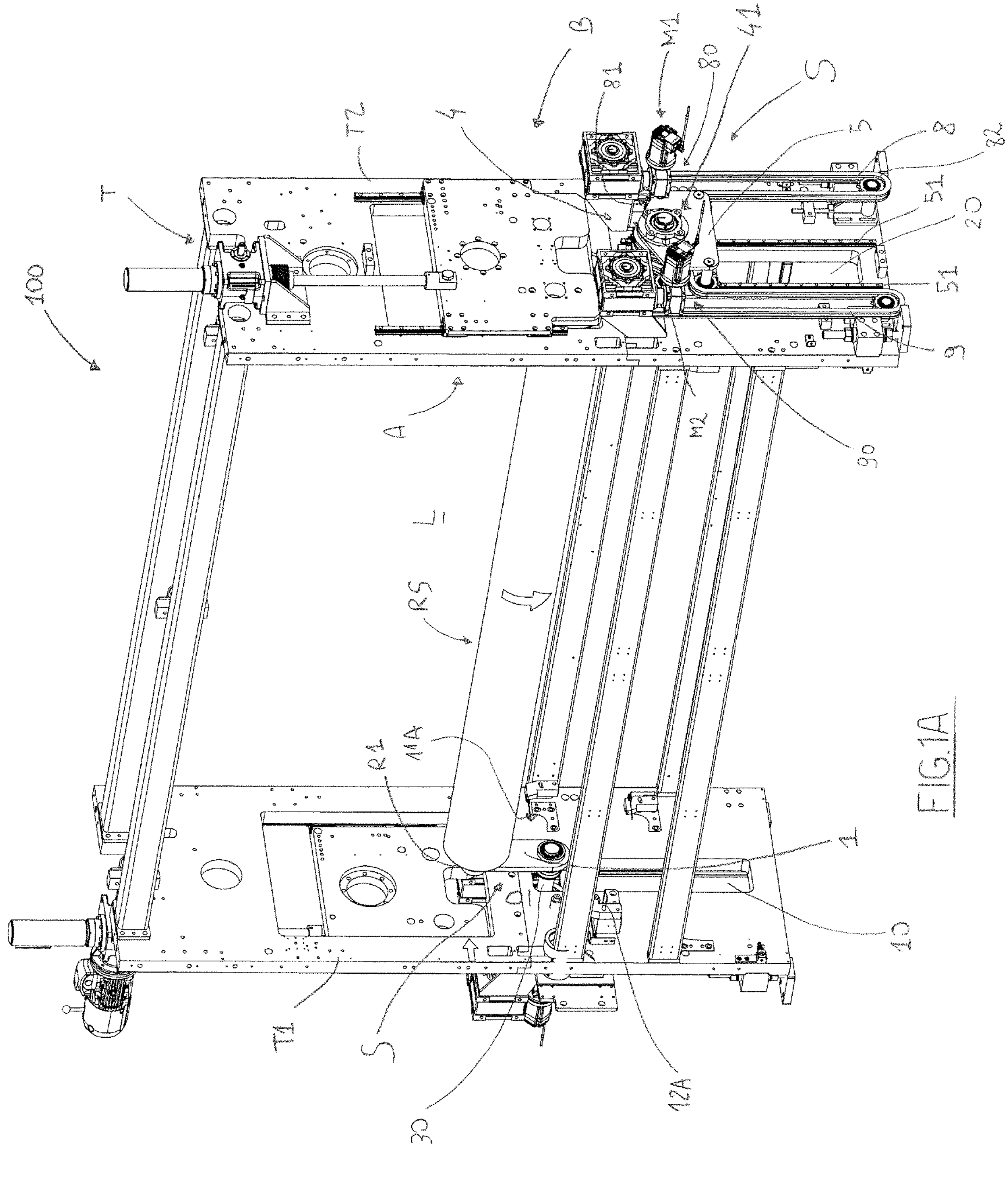
FIG. 1A illustrates, schematically and in a perspective view, the flexographic print station with the automatic system of support and movement of an inking roller of the invention, in the main parts thereof, with other secondary parts not relevant to the invention which have been removed for greater clarity.

With reference to the appended tables of drawings, reference numeral (100) denotes the flexographic print station with an automatic system (S) of support and movement of an inking roller (RS) (also known as an "anilox" roller), object of the present invention, in its entirety.

The print station (100) has a frame (T) comprising at least a first wall (T1) and a second wall (T2) arranged opposite one another and defining there-between a chamber (L) by which a cardboard sheet can be transported in an advancement direction (VA), on which cardboard sheet a print is to be made.

The accompanying figures do not include a detailed illustration of the cardboard sheet on which the printing operations are to be carried out, and which will then be folded to form a box or container.

In the print station, as described in the foregoing, there will be a print roller, provided on the relative print cliché surface and a counter-roller (both not illustrated as of known type and not pertaining to the invention): an inking roller must be positioned below the print roller to transfer the print ink to the print roller.

In FIG. 10, purely by way of example, a schematic illustration is given of the advancement direction (VA) along which the cardboard sheet to be printed can be transported and advanced in such a way as to transit through the chamber (L) of the print station (100), between the print roller and the counter-roller (not illustrated).

Figure 1B:
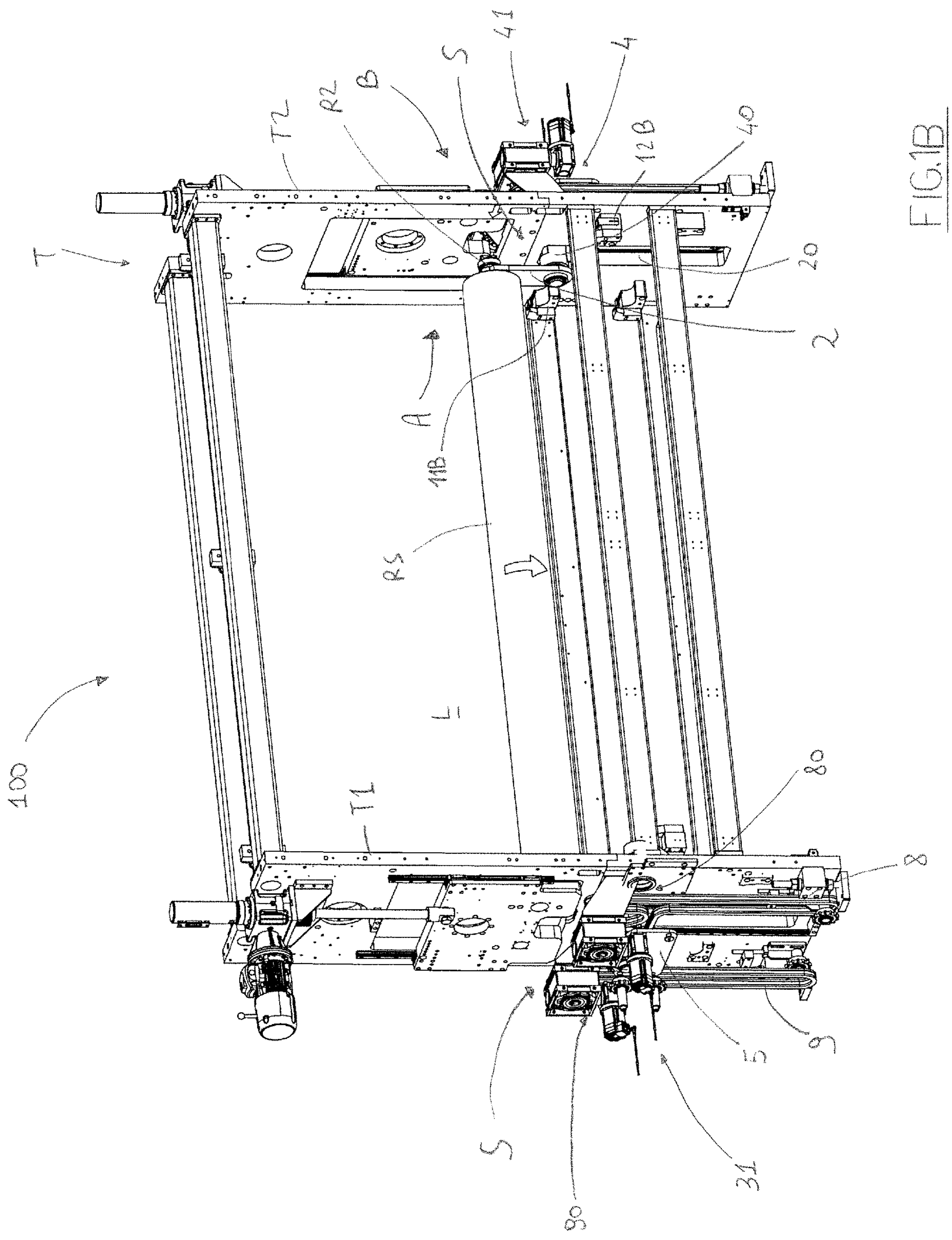
FIG. 1B illustrates, again schematically and in a perspective view taken from another angle, the main parts of the flexographic print station with the automatic system of support and movement of an inking roller object of the present invention.
Figure 1C:
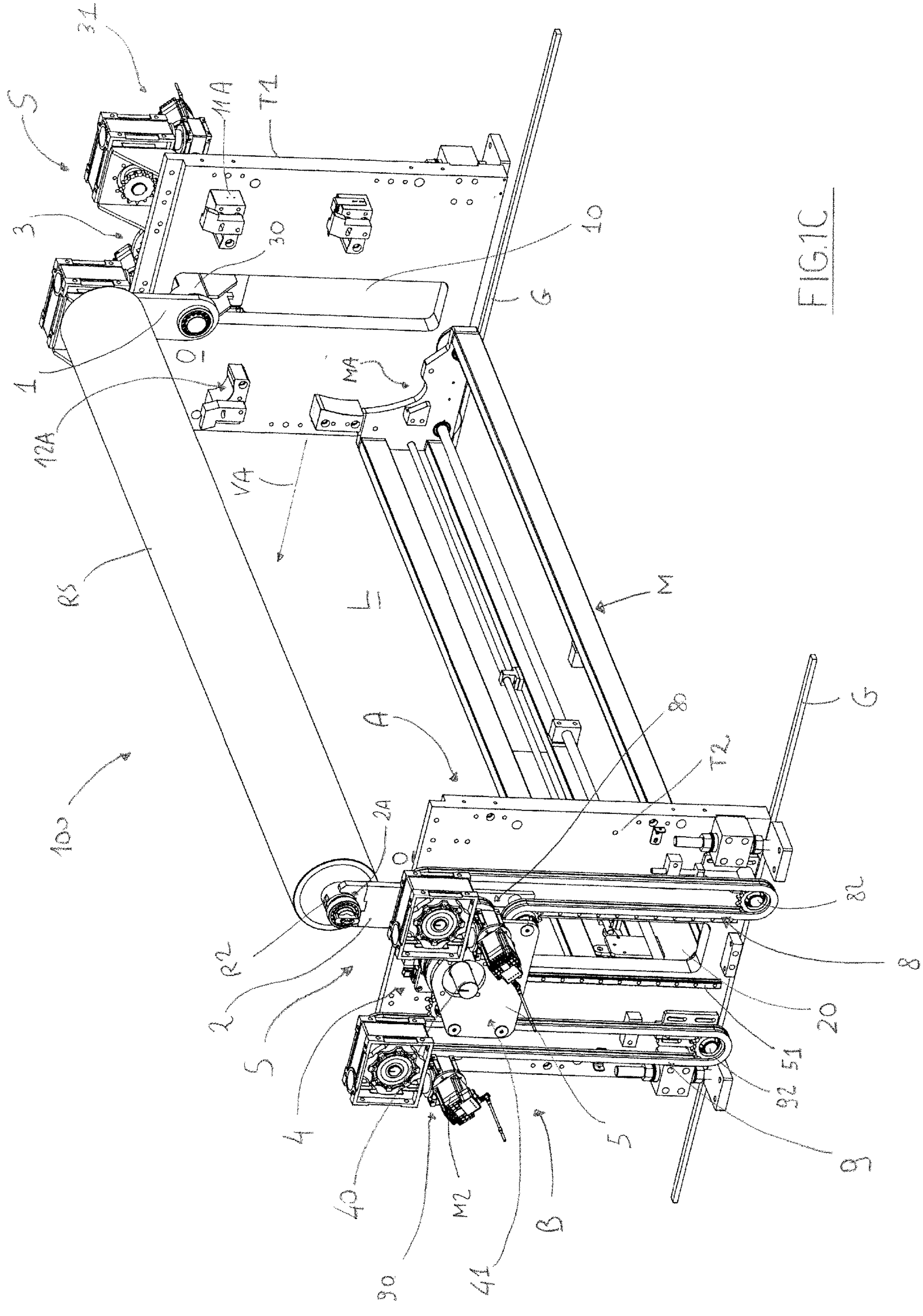
FIG. 1C illustrates, in another perspective view and schematically, the print station of the invention in the main parts thereof.
Figure 1D:
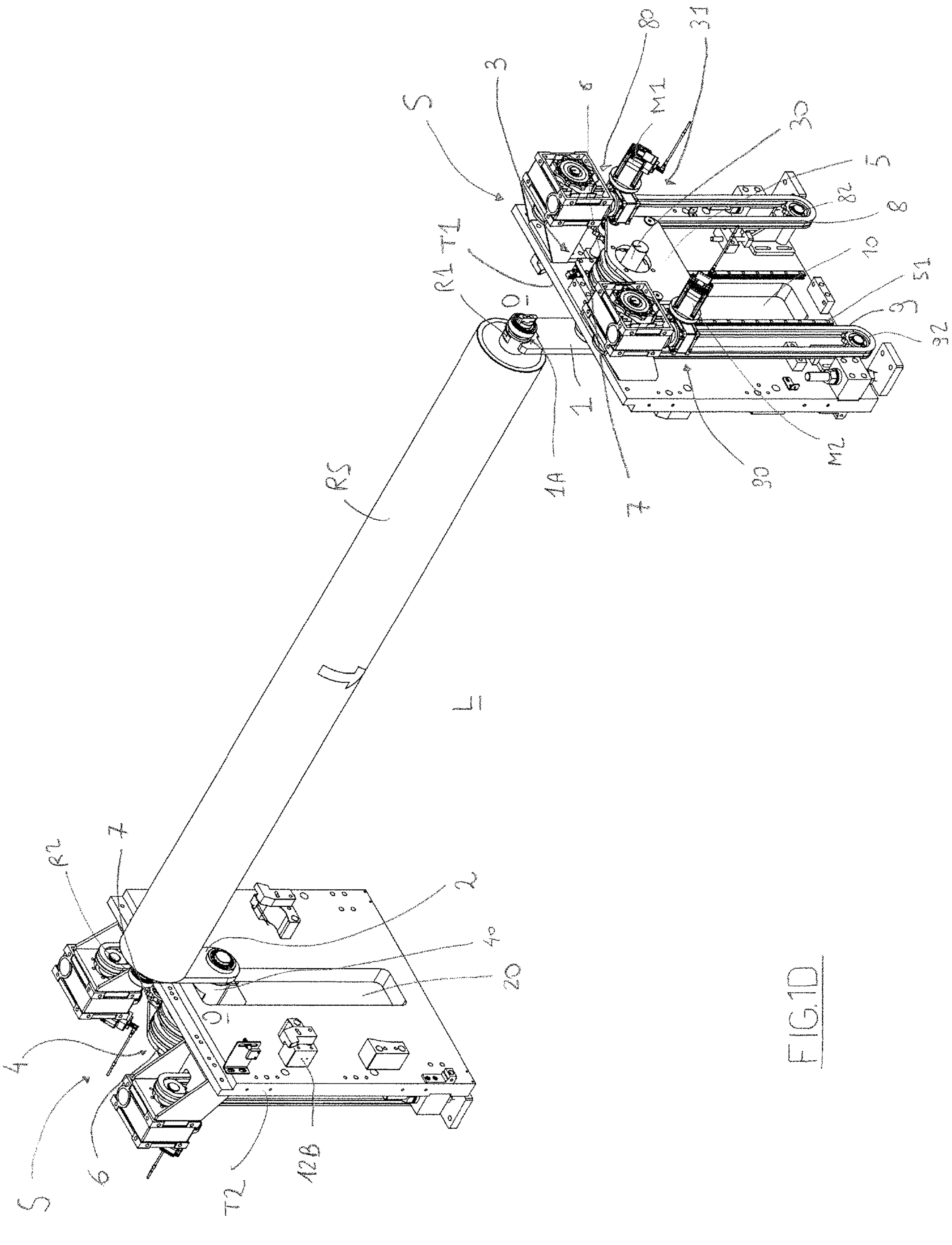
FIG. 1D illustrates, in a schematic and perspective view, the most significant parts of the automatic system of support and movement of the inking roller of the print station of the invention.

The print station (100) of the invention also comprises:

- a first pair of support elements (11A, 11B), which are conformed to be able to restingly receive and support the ends (R1, R2) of an inking roller (RS) and which are predisposed facing one another on respective internal faces of the first wall (T1) and of the second wall (T2), and at a same first height with respect to the ground surface (see for example FIGS. 1A, 1B, 1C);
- at least a second pair of support elements (12A, 12B), which are conformed to be able to restingly receive and support the ends (R1, R2) of an inking roller (RS) and which are predisposed facing one another on respective internal faces of the first wall (T1) and of the second wall (T2), and at a second same height with respect to the ground surface that is different from the first height (see for example FIGS. 1A, 1B, 1D);
- a carriage (M) (visible for example in FIG. 10), movable on relative sliding guides (G), in such a way as to be positionable internally of the chamber (L), between the first wall (T1) and the second wall (T2), and movable out of the chamber (L), which is conformed in such a way as to have a housing (MA) such, when moved and positioned internally of the chamber (L), as to be able to restingly receive and support the ends (R1, R2) of an inking roller (RS).

Further, the print station (100) is realised in such a way as to comprise an automatic system (S) of support and movement of an inking roller (RS).

The automatic system (S) comprises:

- a first support arm (1) that is fork-shaped so as to have a first seat (1A) so as to be able to receive and support a first end (R1) of an inking roller (RS), wherein the first support arm (1) is arranged in the chamber (L) in proximity of the first wall (T1);
- a second support arm (2) that is fork-shaped so as to have a second seat (2A) so as to be able to receive and support a second end (R2) of an inking roller (RS), wherein the second support arm (2) is arranged in the chamber (L) in proximity of the second wall (T2);
- a first movement group (3), for the movement of the first support arm (1), and a second movement group (4), for the movement of the second support arm (2).

More precisely, the first movement group (3) and the second movement group (4) are configured to maintain the first support arm (1) and the second support arm (2) parallel to one another and parallel to the first wall (T1) and to the second wall (T2) and to move the first support arm (1) and the second support arm (2) in vertical translation and/or in rotation with respect to the first wall (T1) and to the second wall (T2) in the following ways.

Figure 2A:
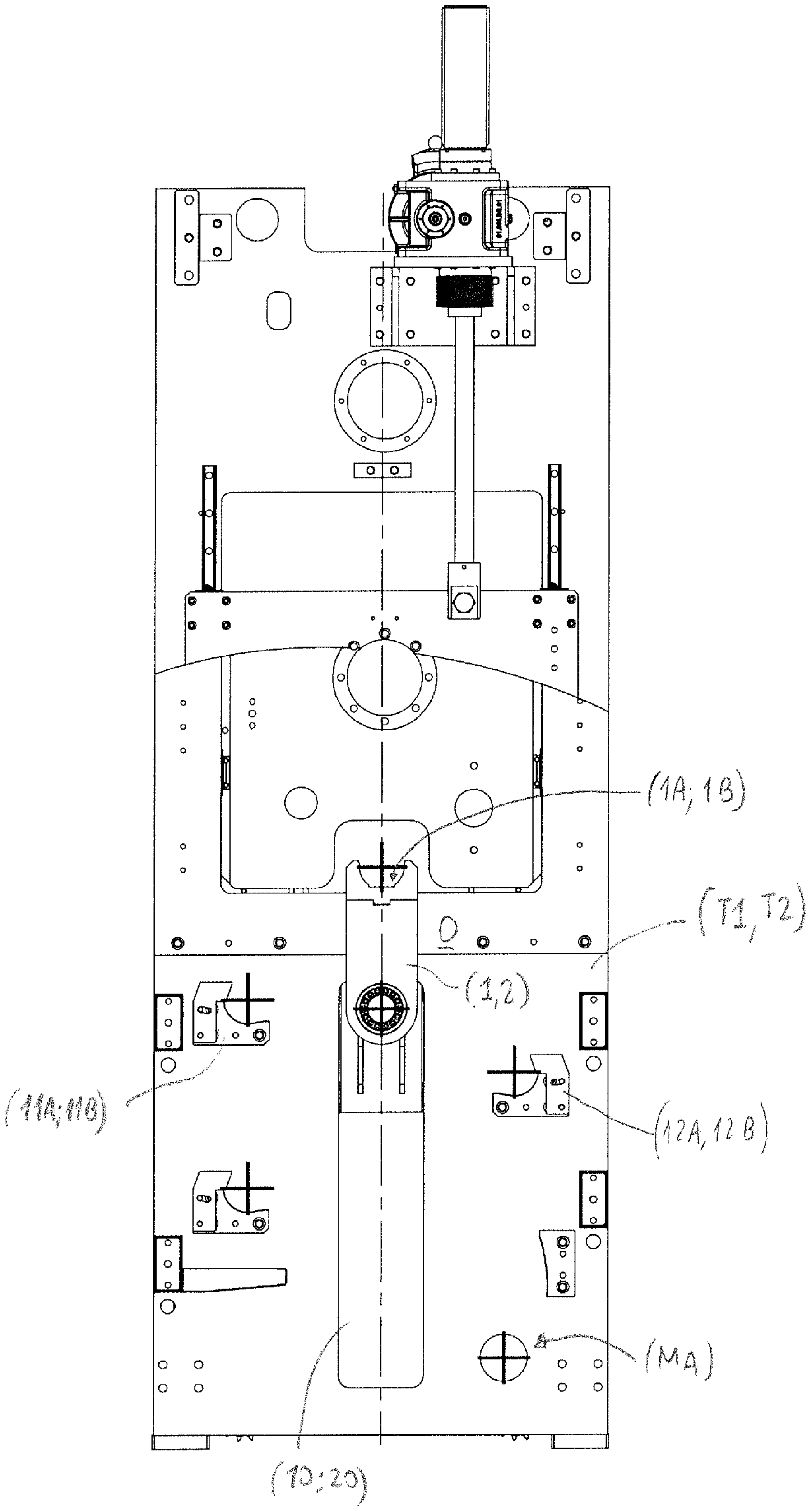
FIG. 2A illustrates a view according to the arrows indicated by letter (A) in FIGS. 1A, 1B, 1C and illustrates the system of support and movement of the inking roller (S) for support and movement of the inking roller in a first possible configuration thereof.
Figure 5A:
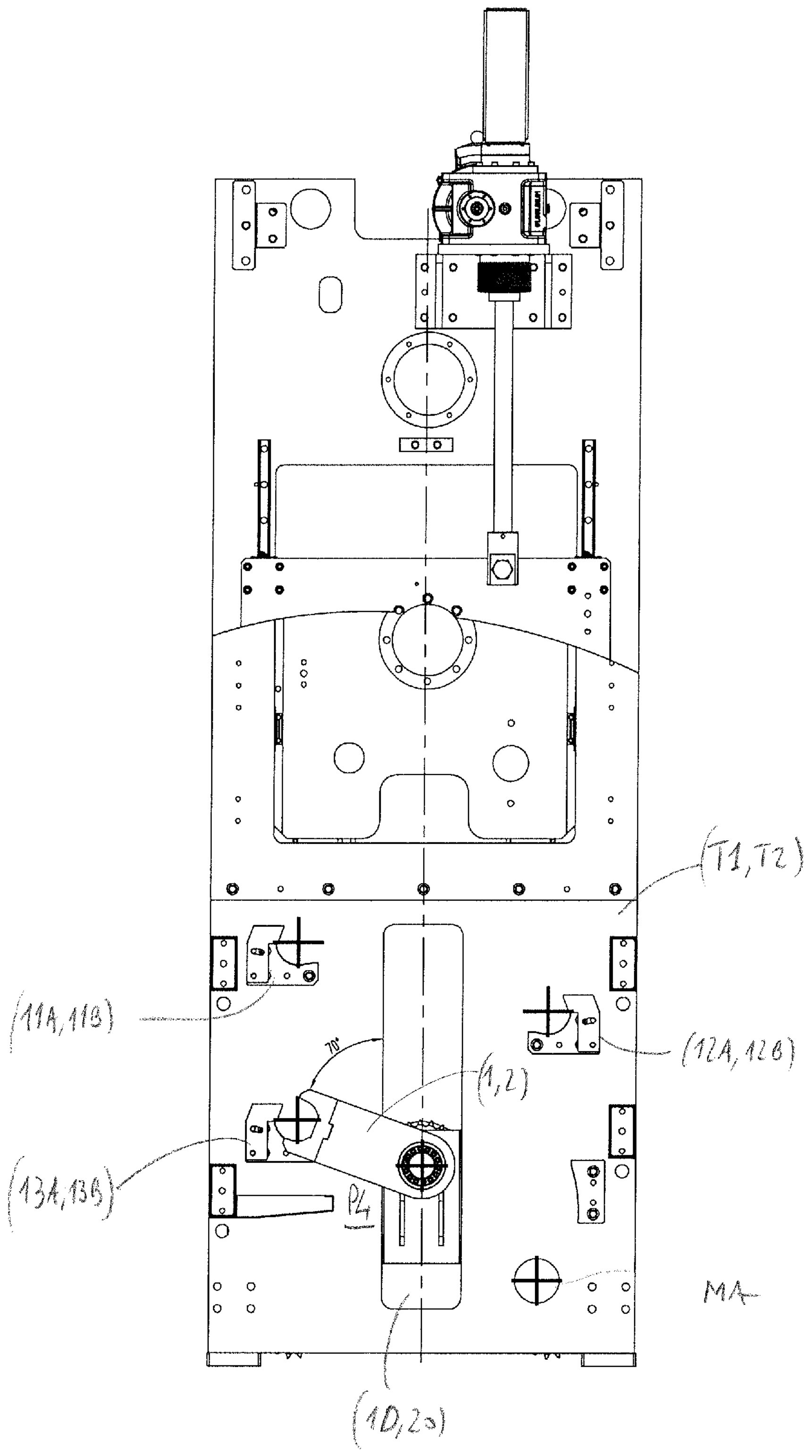
FIG. 5A illustrates a view according to the arrows indicated by letter (A) in FIGS. 1A, 1B, 1C and illustrates the system of support and movement of the inking roller in a fourth possible configuration thereof.
Figure 5B:
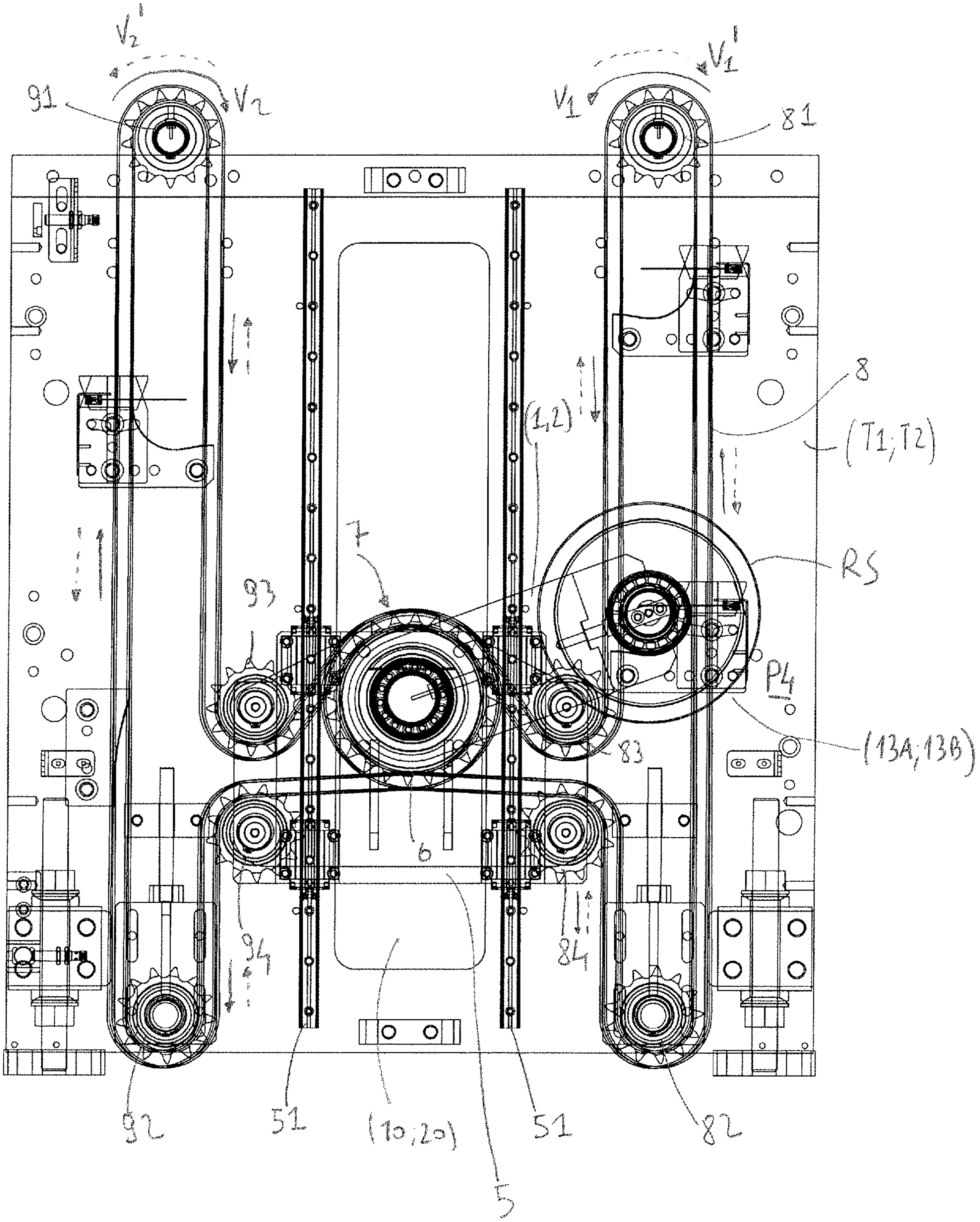
FIG. 5B illustrates a view according to the arrows indicated by letter (B) in FIGS. 1A, 1B, 1C and illustrates the system of support and movement of the inking roller in the fourth possible configuration thereof of FIG. 5A.
Figure 6A:
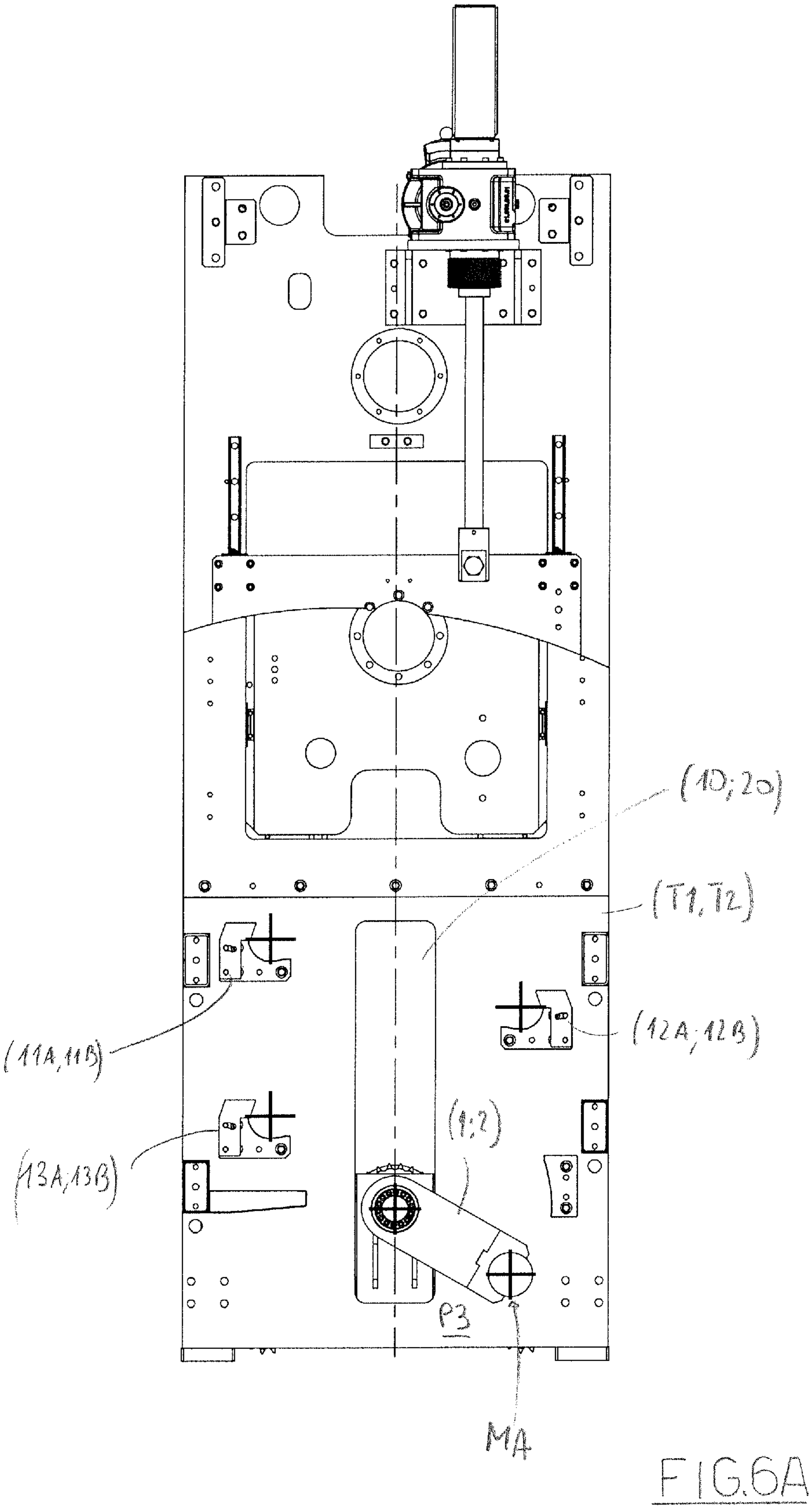
FIG. 6A illustrates a view according to the arrows indicated by letter (B) in FIGS. 1A, 1B, 1C and illustrates the system of support and movement of the inking roller in a fifth possible configuration thereof.
Figure 6B:
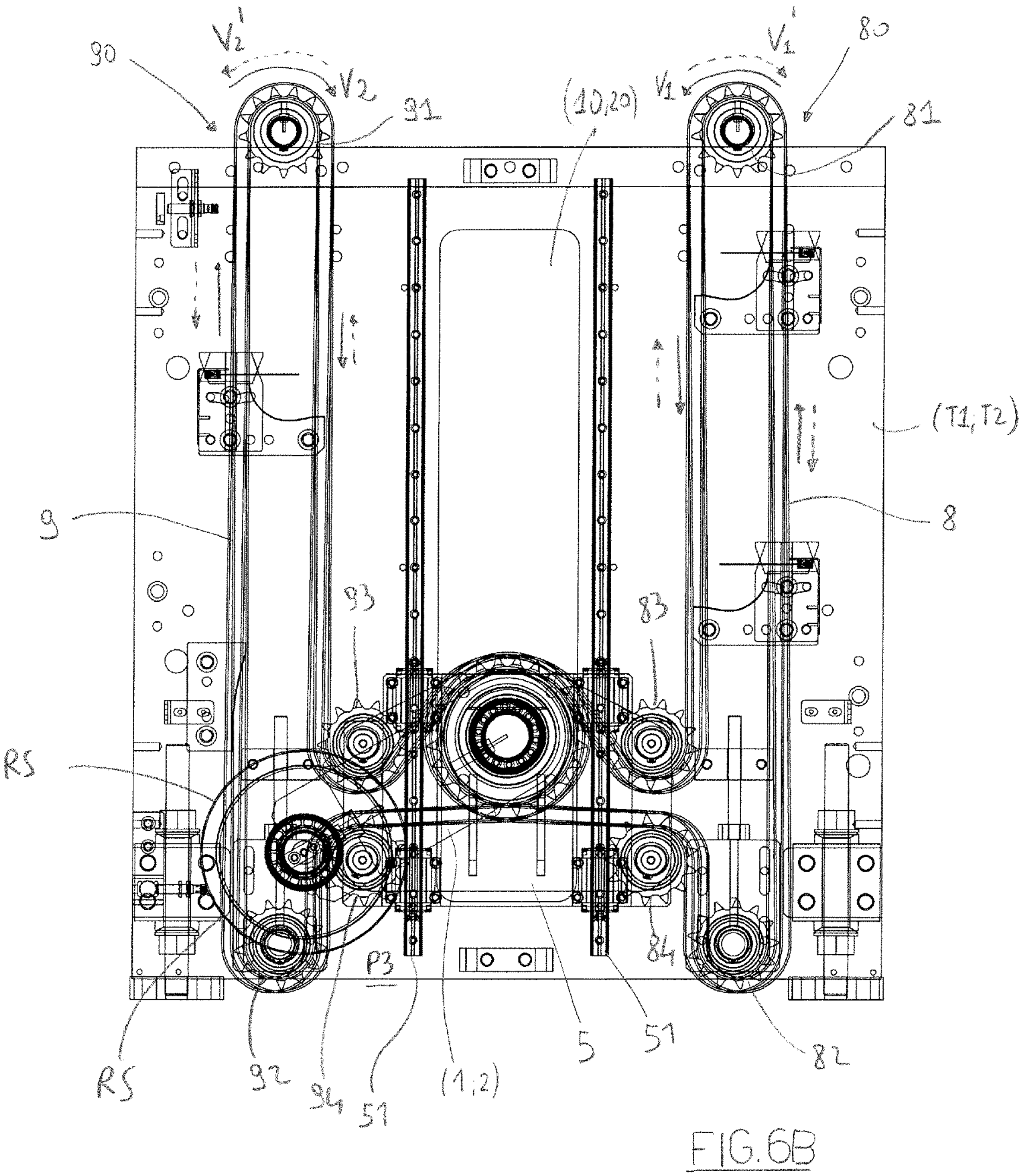
FIG. 6B illustrates a view according to the arrows indicated by letter (B) in FIGS. 1A, 1B, 1C and illustrates the system of support and movement of the inking roller in the fifth possible configuration thereof of FIG. 6A.

The first movement group (3) and the second movement group (4) are configured to move the first support arm (1) and the second support arm (2) in vertical translation and/or in rotation with respect to the first wall (T1) and to the second wall (T2) so that:

- the first support arm (1) and the second support arm (2) can be positioned in a vertical configuration in a raised operating position (O), at which the first and second support arms (1, 2) can position an inking roller (RS) below a print roller and transversally to the advancement direction (VA) of a cardboard sheet to be printed which is advancing in the advancement direction (VA) through the chamber (L) (see for example FIGS. 1A, 1B, 1C), 1D) and FIGS. 2A and 2B), so that the inking roller can be maintained by a relative support unit and be supplied with ink and then, once activated in rotation, transfer the ink to the print roller;
- the first support arm (1) and the second support arm (2) can be translated and rotated with respect to the first wall (T1) and the second wall (T2) in such a way as to be positioned in a first lowered position (P1) in which the first and second support arms (1, 2) are positioned at the first pair of support elements (11A, 11B) so as to be able to release, on the first pair of support elements (11A, 11B), an inking roller (RS), or so as to collect from the first pair of support elements (11A, 11B) an inking roller (RS) positioned there and waiting (see for example FIGS. 3A, 3B);

the first support arm (1) and the second support arm (2) can be translated and rotated with respect to the first wall (T1) and to the second wall (T2) in such a way as to be positioned in a second lowered position (P2) in which the first and second support arms (1, 2) are positioned at the second pair of support elements (12A, 12B) so as to be able to release, on the second pair of support elements (2A, 12B), an inking roller (RS), or so as to collect from the second pair of support elements (12A, 12B) an inking roller (RS) positioned there and waiting (see for example FIGS. 5A, 5B);

the first support arm (1) and the second support arm (2) can be translated and rotated with respect to the first wall (T1) and the second wall (T2) in such a way as to be positioned in a third lowered position (P3) wherein the first and second support arms (1, 2) are positioned at the housing (MA) of the carriage (M) positioned in the chamber (L), so as to be able to release in the housing (MA) an inking roller (RS), or so as to collect from the housing (MA) of the carriage (M) an inking roller (RS) positioned there and waiting (see for example FIGS. 6A, 6B).

Owing to this peculiarity, the print station (100) of the invention is extremely versatile, as, while an inking roller, with a predetermined first surface screen (i.e. a first weft of ink-collecting cells) is maintained in the operating position of printing, i.e. in the raised operating position (O) for the transfer of the ink to the print roller, and thus enabling the print roller to carry out the printing operations on the sheets of cardboard advancing along the advancement direction through the chamber (L), the same print station (100) will be able to have, internally, also a second other inking roller (for example with the first surface screen or with a second different surface screen) positioned waiting at the first pair of support elements, and even a third other inking roller, for example with a third different surface screen, positioned waiting at the housing of the carriage.

The second pair of support elements, on the other hand, can remain free, and thus constitute a depot, i.e. a free store, utilisable when needed for the temporary positioning of the inking roller used for the transfer of the ink to the print roller when it is desired to replace it with another inking roller present internally of the print station, either because it is positioned on the first pair of support elements or because it is in the housing of the carriage.

With the automatic system (S) for support and movement of the inking roller, the print station (100) of the invention is also able to carry out the change of the inking roller effectively and rapidly.

In fact, at the time when the inking roller up to that moment used to transfer the ink to the print roller must be replaced (or possibly also be subjected to cleaning operations), then the first movement group (3) and the second movement group (4) can move the first support arm and the second support arm into the raised operating position (O), to collect the inking roller to be replaced, and thus move them and position them in the second lowered position (P2), at the second pair of support elements (12A, 12B) (which is free as mentioned in the foregoing) then to release the inking roller to be replace onto the second pair of support elements.

In this way, the inking roller that has been released and rested on the second pair of support elements is substantially parked to await a subsequent use thereof or to await being collected to be subjected to cleaning operations.

Alternatively, and possibly, in a case in which the housing (MA) of the carriage (M) is also left free and not occupied by an inking roller, the first movement group (3) and the second movement group (4) can move the first support arm and the second support arm so as to position them in the third lowered position (P3), at the housing, and release the inking roller to be replaced there. The carriage can therefore be translated along the relative sliding guides (G) so as to be borne out of the chamber of the print station, where the inking roller borne thereby can be subjected to cleaning operations, or the carriage can be moved up to reaching and being positioned in another print station where the inking roller transported thereby where it is to be used.

Then, once the inking roller has been released on the second pair of support elements, or possibly on the carriage, the first movement group (3) and the second movement group (4) can move the first support arm and the second support arm so as to position them in the first lowered position (P1), at the first pair of support elements (11A, 11B) on which the second inking roller is positioned in wait mode (for example having a surface screen different to or utilisable for transferring an ink of a different colour to the print roller), in such a way as to collect the second inking roller, and then the first movement group (3) and the second movement group (4) can move the first support arm and the second support arm to return them into the raised operating position, and thus enable the second inking roller to be maintained, once hooked by the support unit, in the operating position below the print roller.

Alternatively, in the case of a preceding inking roller that has been positioned on the second pair of abutment elements, then the first movement group (3) and the second movement group (4) can move the first support arm and the second support arm so as to position them in the third lowered position (P3), when, in the relative housing, another inking roller is positioned in the carriage, in such a way as to be able to collect the other inking roller, and therefore the first movement group (3) and the second movement group (4) can move the first support arm and the second support arm to return them into the raised operating position, and then position the other print roller in the relative operating position for the transfer of the ink to the print roller.

It is therefore evident from the above how the print station of the present invention is extremely versatile, as it is able to store a plurality of inking rollers internally thereof at the same time, even different from one another, as they have a different surface screen, with a weft or variable cell density, to be utilised with an ink of a different colour, and carry out rapidly and effectively, as required, the change and replacement of one inking roller with another.

It is specified that the changing sequences of the inking roller described in the foregoing are not limiting or exhaustive, and the print station, in particular, the first movement group and the second movement group can move the first support arm and the second support arm according to differing modalities.

For example, it is possible to position two inking rollers in waiting mode on both the first pair of support elements and on the second pair of support elements, and keep the housing of the carriage free, as a free depot on which the inking roller to be replaced with another is temporarily deposited.

In this case, to carry out the change of the inking roller, the first support arm and the second support arm can be moved from the raised operating position thereof to the third lowered position thereof, at the housing of the carriage, so as to release the inking roller to be replaced therein, and thus be moved into the second lowered position thereof, at the second pair of support elements, so as to collect an inking roller (RS) positioned there and waiting, or be moved into the first lowered position thereof, at the first pair of support elements, so as to collect another inking roller positioned there and waiting.

Thereafter, the first support arm and the second support arm, after having collected an inking roller from the second pair of support elements, or an inking roller from the first pair of support elements, can be moved to be repositioned in the raised operating position thereof, so as to position the inking roller in the relative operating position below the print roller.

The preceding inking roller released in the housing of the carriage can be subjected to any possible cleaning operations or can be transferred, following the movement of the carriage along the relative sliding guides, at another print station.

According to the various specific requirements, further and other sequences of movement can be performed for the first and second support arm, as well as other arrangements of the inking rollers to be positioned in waiting mode on the first or second pair of support elements or in the housing of the carriage.

Further advantageous characteristics of the print station proposed by the present invention are described in the following.

The print station is preferably made in such a way that the first wall (T1) comprises a first vertical through-slot (10) and the second wall (T2) comprises a second vertical through-slot (20).

The first movement group (3) of the first support arm (1) comprises a first drive shaft (30) arranged transversally to the first wall (T1) in such a way as to cross the first vertical through-slot (10) and with the first support arm (1) being constrained to the first drive shaft (30), while in turn the second movement group (4) of the first support arm (2) comprises a second drive shaft (40) arranged transversally to the second wall (T2) in such a way as to cross the second vertical through-slot (20) and with the second support arm (2) being constrained to the second drive shaft (40).

In particular, the first drive shaft (30) and the second drive shaft (40) are aligned on a same common axis.

In this case, then, the first movement group (3) and the second movement group (4) are configured so as to move the first drive shaft (30) and the second drive shaft (40) in translation along the first vertical through-slot (10) and the second vertical through-slot (20) and/or to activate the first drive shaft (30) and the second drive shaft (40) in rotation about the common axis.

In greater detail the first movement group (3) comprises first driving means (31) of the first drive shaft (30) which are configured so as to drive the first drive shaft (30) in translation along the first vertical through-slot (10) and/or to drive the first drive shaft (30) in rotation about the common axis.

In particular, the first driving means (31) are arranged externally of the chamber (L) and externally of the first wall (T1).

In turn, the second movement group (4) comprises second driving means (41) of the second drive shaft (40), which are configured so as to drive the second drive shaft (40) in translation along the second vertical through-slot (20) and/or to drive the second drive shaft (40) in rotation about the common axis.

In particular, the second driving means (41) are arranged externally of the chamber (L) and externally of the second wall (T2).

Therefore, owing to the presence of the two vertical through-slots on the two walls (T1, T2), the activating means of the two support arms, by means of the two drive shafts which cross the two vertical through-slots, can be predisposed externally of the chamber of the print station where the printing operations take place.

FIGS. 2B, 3B, 4B, 5B and 6B illustrate the view of the external face of one of the two walls (T1, T2): the first driving means (31) for the activation of the first drive shaft (30) will be included and arranged on the external face of the first wall (T1) the first drive shaft being responsible for the movement of the first support arm (1), while the second driving means (41) for the activation of the second drive shaft (40) will be arranged on the external face of the second wall (T2), the second drive shaft being responsible for the movement of the second support arm (2).

According to the preferred though not exclusive embodiment illustrated in the figures, the print station is realised in such a way that the first driving means (31) and the second driving means (41) are configured in such a way that each thereof comprises:

- a platform (5) translatably mounted on vertical sliding guides (51);
- a first pinion (6) rotatably mounted on the platform (5);
- a second pinion (7) rotatably mounted on the platform (5);
- the first drive shaft (30) and the second drive shaft (40) being constrained, by an end thereof, to the first pinion (6) and the second pinion (7).

The first (31) and second (41) activating means each further comprise:

- a first loop-wound chain (8) wound about the first pinion (6);
- a second loop-wound chain (9) wound about the second pinion (7);
- first movement means (80) of the first loop-wound chain (8);
- and second movement means (90) of the second loop-wound chain (9).

In particular, the first loop-wound chain (8) and the second loop-wound chain (9) are reciprocally arranged one with respect to another and with respect to the platform (5) in such a way that when:

- the first movement means (80) and the second movement means (90) move the first loop-wound chain (8) and the second loop-wound chain (9) in rotation in respective different rotation directions that are opposite one another (see the unbroken arrows (V1, V2) or the dotted arrows (V1', V2') in FIGS. 2B, 3B, 4B, 5B and 6B) to drive in rotation the first pinion (6) and the second pinion (7) in opposite rotation directions, the platform (5) is translated along the vertical guides (51) so as to move the first drive shaft (30) and the second drive shaft (40) in translation along the first vertical through-slot (10) and along the second vertical through-slot (20), and thus vertically translate the first support arm (1) and the second support arm (2);
- the first movement means (80) and the second movement means (90) move the first loop-wound chain (8) and the second loop-wound chain (9) in rotation in respective agreeing rotation directions (see the unbroken and dotted arrows (V1, V2') (or the unbroken and dotted arrows (V1, V2) in FIGS. 2B, 3B, 4B, and 6B) to drive in rotation the first pinion (6) and the second pinion (7) in agreeing rotation directions, then the first drive shaft (30) and the second drive shaft (40) are driven in rotation about the common rotation axis and thus also the first support arm (1) and the second support arm (2) are driven in rotation;

the first movement means (80) and the second movement means (90) move one of the two loop-wound chains (8, 9) in rotation and maintain the other of the two loop-wound chains (8, 9) stationary, then the platform (5) is translated along the vertical guides (51) so as to move the first drive shaft (30) and the second drive shaft (40) in translation along the first vertical through-slot (10) and the second vertical through-slot (20) and at the same time drive the first drive shaft (30) in rotation and the second drive shaft (40) in rotation about the common rotation axis so that the first support arm (1) and the second support arm (2) are contemporaneously vertically translated and rotated.

In this regard, therefore, the first movement means (80) of the first loop-wound chain (8) and the second movement means (90) of the second loop-wound chain (9) are configured in such a way as to be able to contemporaneously drive the first loop-wound chain (8) and the second loop-wound chain (9) both in a same rotation direction (V1, V2' or V1', V2) and in opposite rotation directions (V1, V2 or V1', V2'), and to be able to drive the first loop-wound chain (8), in a rotation direction (V1) or in the other rotation direction (V1'), while maintaining the second loop-wound chain (9) stationary, and also to be able to drive the second loop-wound chain (9), in one rotation direction (V2) or the other (V2'), keeping the first loop-wound chain (8) stationary.

In the preferred embodiment, illustrated in FIGS. 2B, 3B, 4B, 5B and 6B, the first movement means (80) of the first loop-wound chain (8) comprise, on each of the external faces of the two walls (T1, T2), a first toothed pulley (81), in a raised position and drivable in rotation by means for a first motor means (M1), and a second toothed pulley (82), in a lowered position and vertically aligned to the first toothed pulley (81); a third toothed pulley (83), rotatably mounted on the platform (5) at a first side of the first pinion (6) and the second pinion (7) in a raised position, and a fourth toothed pulley (84), rotatably mounted on the platform (5) at a first side of the first pinion (6) and the second pinion (7) in a lowered position and vertically aligned to the third toothed pulley (83).

The first loop-wound chain (8) is then loop-wound about the first (81), second (82), third (83) and fourth (84) toothed pulley.

In turn, the second movement means (90) of the second loop-wound chain (9) comprise, on each of the external faces of the two walls (T1, T2), a fifth toothed pulley (91), in a raised position and drivable in rotation by means of a second motor means (M2), on an opposite side to the first toothed pulley (81) with respect to the platform (5), and a sixth toothed pulley (92), in a lowered position and vertically aligned to the fifth toothed pulley (91), on an opposite side to the second toothed pulley (82) with respect to the platform (5); a seventh toothed pulley (93), rotatably mounted on the platform (5) at a second side of the first pinion (6) and of the second pinion (7) in a raised position on an opposite side with respect to the third toothed pulley (83), and an eighth toothed pulley (94), rotatably mounted on the platform (5) at a second side of the first pinion (6) and the second pinion (7) in a lowered position and vertically aligned to the seventh toothed pulley (93), on an opposite side to the fourth toothed pulley (84).

The second loop-wound chain (9) is loop-wound about the fifth (91), sixth (92), seventh (93) and eighth (94) toothed pulley.

Figure 2B:
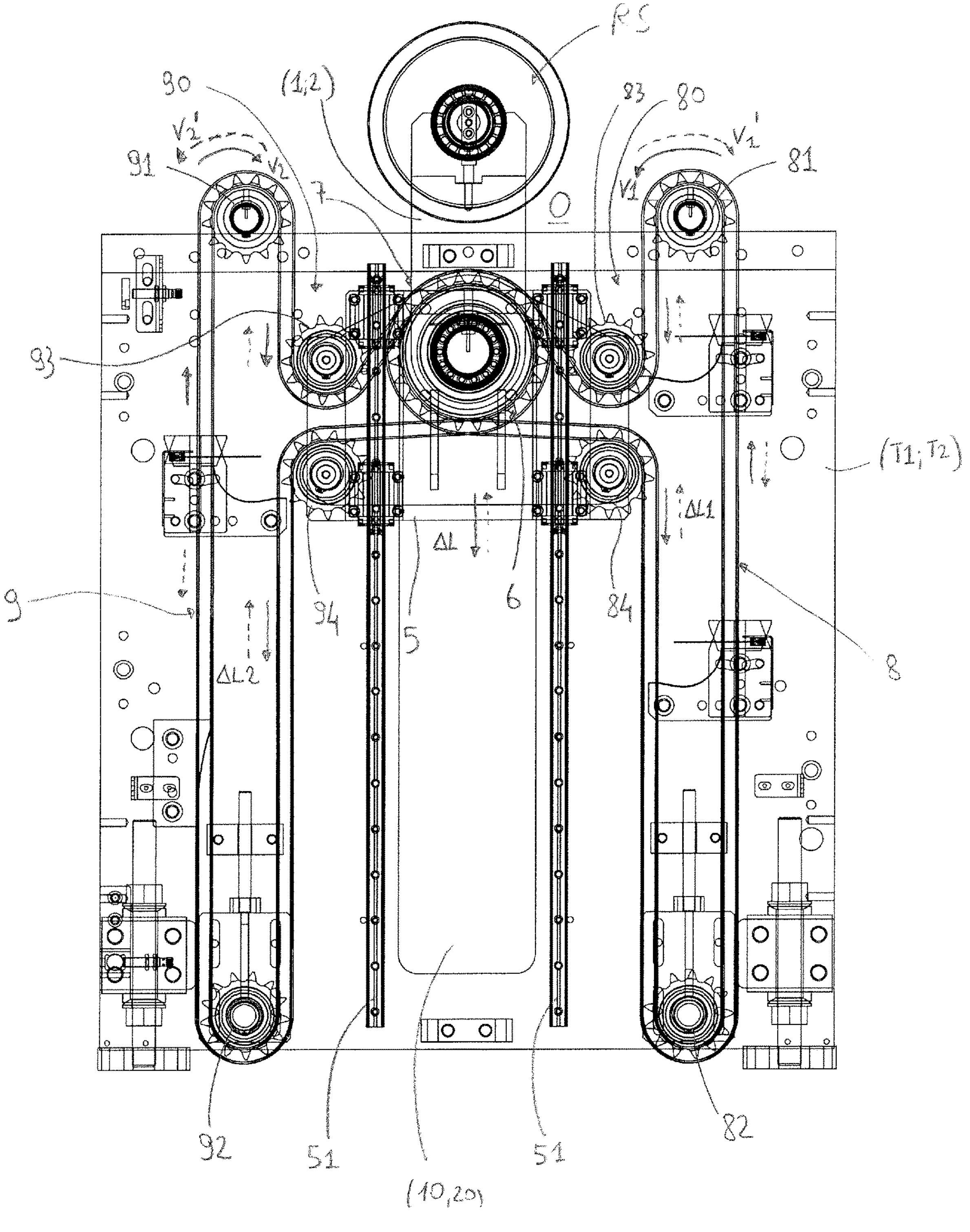
FIG. 2B illustrates a view according to the arrows indicated by letter (B) in FIGS. 1A, 1B, 1C and illustrates the system of support and movement of the inking roller in the first possible configuration of FIG. 2A.
Figure 3A:
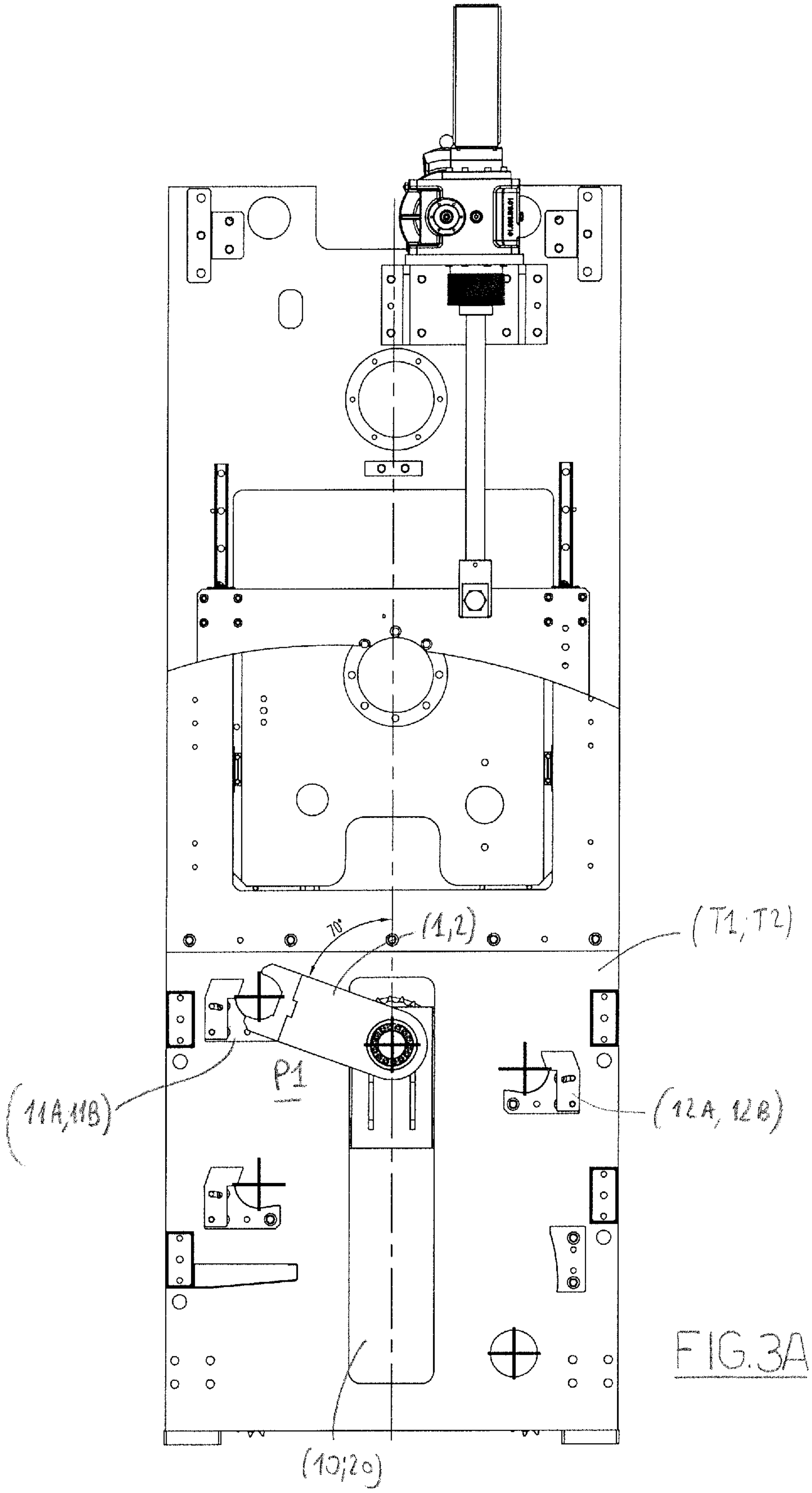
FIG. 3A illustrates a view according to the arrows indicated by letter (A) in FIGS. 1A, 1B, 1C and illustrates the system of support and movement of the inking roller (S) for support and movement of the inking roller in a second possible configuration thereof.
Figure 3B:
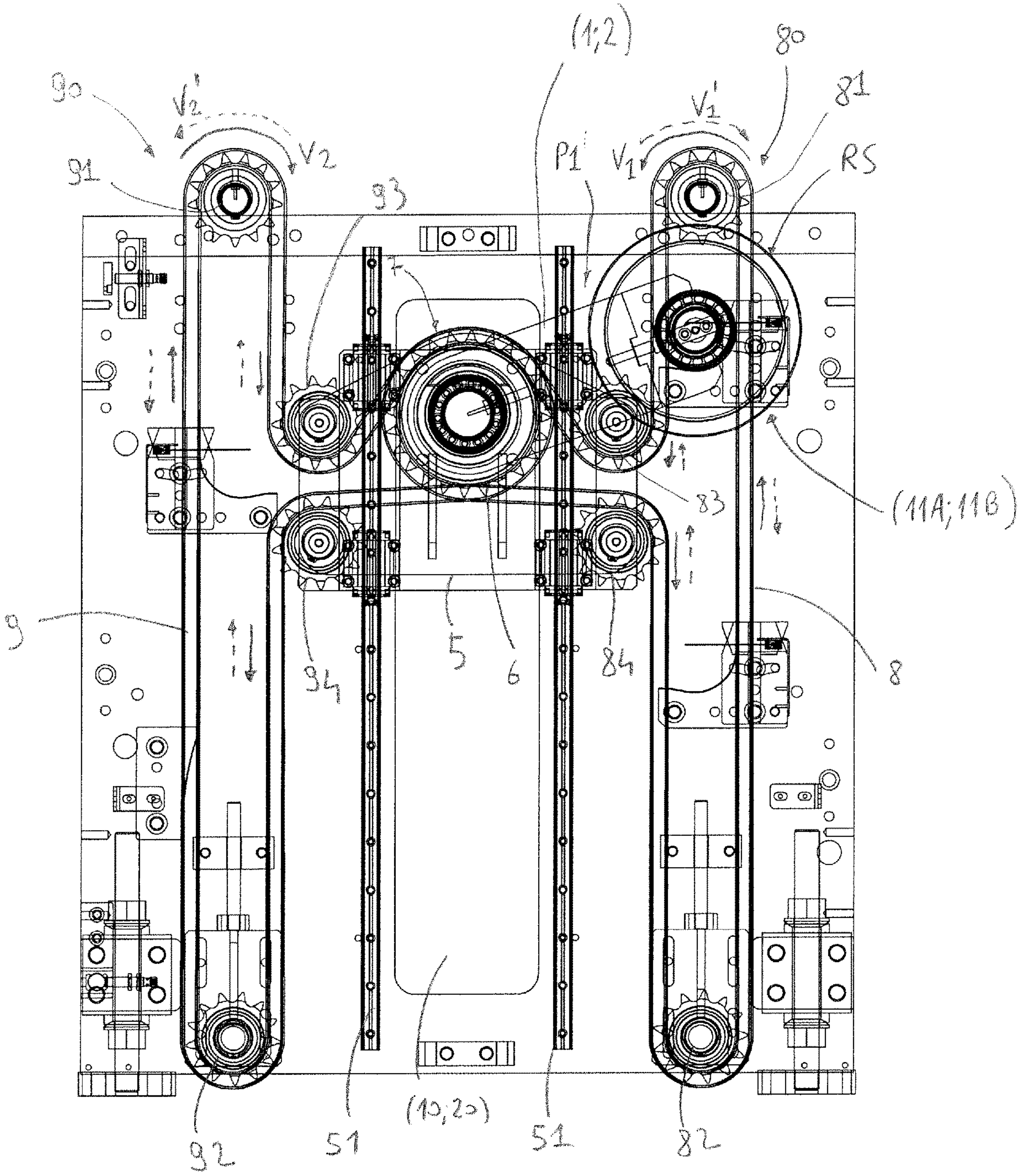
FIG. 3B illustrates a view according to the arrows indicated by letter (B) in FIGS. 1A, 1B, 1C and illustrates the system of support and movement of the inking roller (S) for support and movement of the inking roller in the second possible configuration thereof of FIG. 3A.
Figure 4A:
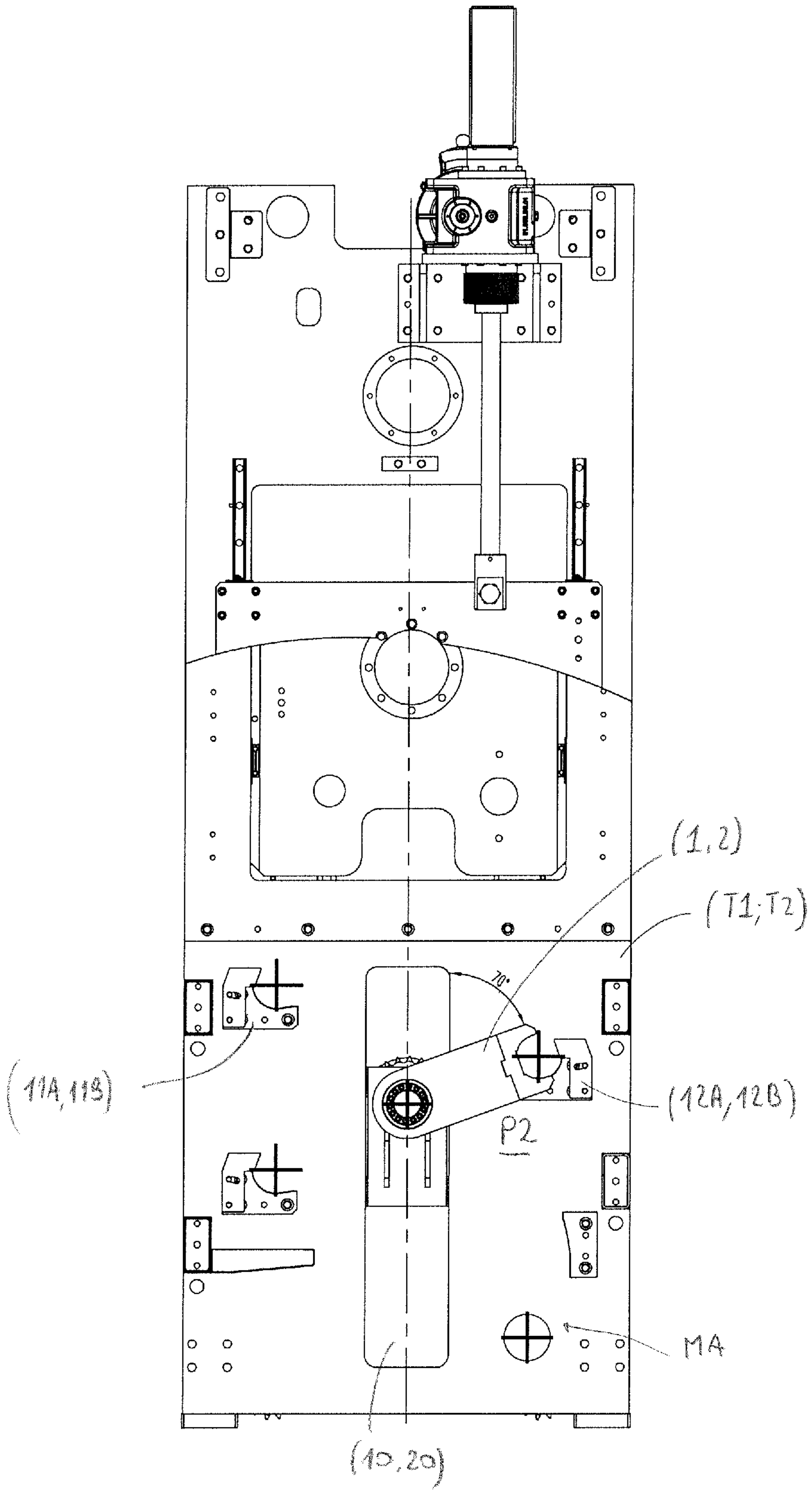
FIG. 4A illustrates a view according to the arrows indicated by letter (A) in FIGS. 1A, 1B, 1C and illustrates the system of support and movement of the inking roller (S) for support and movement of the inking roller in a third possible configuration thereof.
Figure 4B:
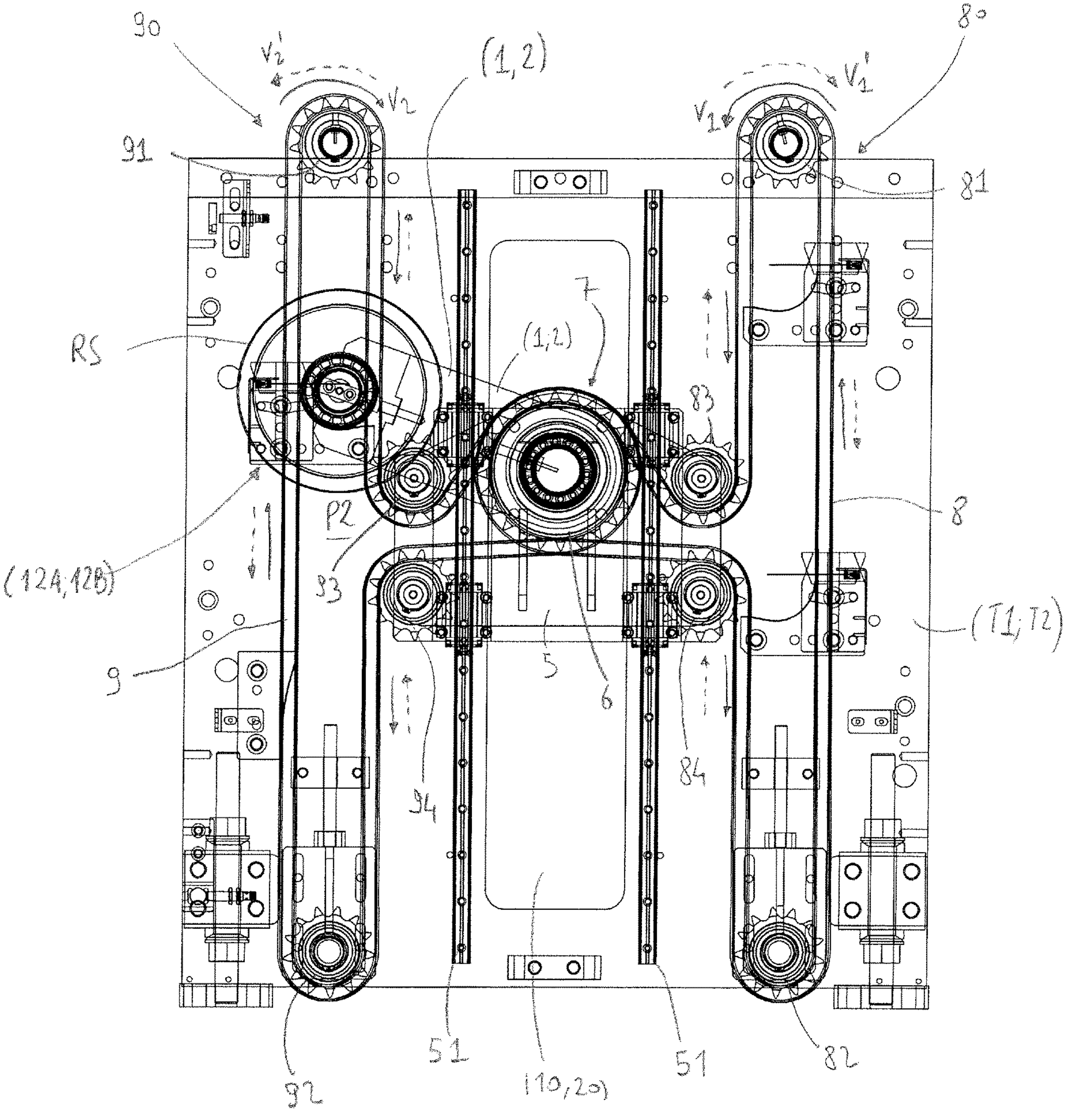
FIG. 4B illustrates a view according to the arrows indicated by letter (B) in FIGS. 1A, 1B, 1C and illustrates the system of support and movement of the inking roller in the third possible configuration thereof of FIG. 4A.

Referring for example to FIG. 2B, which illustrates the situation in which the first support arm (1) and the second support arm (2) are positioned in the raised operating position (O) thereof in order to position an inking roller (RS) in the operative position below the print roller inside the chamber (L), should the first driving means (80) activate the first loop-wound chain (8) in rotation in the anticlockwise direction (V1) and the second driving means (90) activate the second loop-wound chain (9) in an opposite direction (V2), the clockwise direction, then the platform (5) will be translated vertically downwards (unbroken vertical arrows).

In particular, in order to carry out this displacement, the first motor (M1) and the second motor (M2) will be activated at the same time, with an identical rotation velocity and in opposite rotation directions.

Indicating with ΔL1 the length of the unwinding of the first loop-wound chain (8) and with ΔL2 the unwinding of the second loop-wound chain (9), the platform (5) will translate downwards by an entity of ΔL=(ΔL1+ΔL2)/2. By inverting, on the other hand, the rotation directions of the two motors, and therefore the two chains (directions V1' and V2'), the platform (5) will be translated vertically upwards (dotted arrows and lines).

Once again starting from the situation illustrated in FIG. 2B, should the first driving means (80) activate the first loop-wound chain (8) in rotation in the clockwise direction (V1') and the second driving means (90) activate the second loop-wound chain (9) in a same direction (V2), the clockwise direction, then the platform (5) will remain stationary (ΔL1=−ΔL2, therefore ΔL=0) while the first support arm (1) and the second support arm (2) will be rotated in the clockwise direction.

In fact, while the first loop-wound chain (8) unwinds according to the dotted lines, the second loop-wound chain (9) unwinds according to the unbroken lines (i.e. the two chains unwind in an opposite way to one another) and therefore the platform (5) remains stationary, while the first pinion (6) and the second pinion (7) both rotate in the clockwise direction.

By inverting the situation, the platform will always remain stationary but the first support arm and the second support arm will rotate in an opposite direction, i.e. anticlockwise.

By setting up the above-described movements, and keeping one motor stationary while rotating the other, it will be possible to impart the desired translations on the platform, upwards or downwards, and also impart on the two pinions, and therefore on the first support arm and the second support arm, the desired rotations, in such a way as to be able to move and position, time by time, the first support arm and the second support arm, whether in the raised operating position (the position in which the inking roller is positioned below the print roller and maintained in position by the support unit), in the first lowered position (at the first pair of support elements), in the second lowered position (at the first pair of support elements) or in the third lowered position (at the housing of the carriage).

In other preferred aspects, the first pair of support elements (11A, 11B) can be arranged on one side of the first vertical through-slot (10) and of the second vertical through-slot (20) while the second pair of support elements (12A, 12B) is arranged on the opposite side of the first vertical through-slot (10) and of the second vertical through-slot (20).

The carriage (M) can be movable along the relative sliding guides (G) in such a way as to be positionable internally of the chamber (L), between the first wall (T1) and the second wall (T2), in a position arranged below the first pair of support elements (11A, 11B) or in a position arranged below the second pair of support elements (12A, 12B).

The print station can preferably also comprise a third pair of support elements (13A, 13B) (see for example FIGS. 5A, 5B), which are conformed to be able to restingly receive and support the ends (R1, R2) of an inking roller (RS) and which are predisposed facing one another on respective internal faces of the first wall (T1) and of the second wall (T2), and at a same third height with respect to the ground surface, different to the first height, where the first pair of support elements (11A, 11B) is arranged, and different to the second height, in which the second pair of support elements (12A, 12B) is arranged.

The third pair of support elements (13A, 13B) can be arranged in a position below the first pair of support elements (11A, 11B) or can be arranged in a position below the second pair of support elements (12A, 12B).

In this way, the third pair of support elements can keep a third further inking roller waiting, to be used for the replacement of the one in the operating position below the print roller.

In this case, the first movement group (3) and the second movement group (4) will be configured to move the first support arm (1) and the second support arm (2) in vertical translation and/or in rotation with respect to the first wall (T1) and to the second wall (T2) so that the first support arm (1) and the second support arm (2) can be translated and rotated with respect to the first wall (T1) and to the second wall (T2) in such a way as to be positioned in a fourth lowered position (P4) in which they are positioned at the third pair of support elements (13A, 13B) so as to collect from the third pair of support elements (13A, 13B) an inking roller (RS) positioned there waiting or so as to release an inking roller (RS) on the third pair of support elements (13A, 13B) (in a case where the third pair of support elements is free and waiting to receive an inking roller).

The cleaning operations of the inking rollers can be predisposed in such a way as to be able to carry them out, always at a prefixed position internally of the print station, for example each time an inking roller (RS) is positioned on the third pair of support elements (13A, 13B), i.e. when the first support arm (1) and the second support arm (2), which bear an inking roller collected from the relative operating position, therefore from the relative raised operating position (O), are moved and positioned in the fourth lowered position (P4) at which they release the inking roller on the third pair of support elements (13A, 13B).

The invention claimed is:

1. A flexographic print station with an automatic system of support and movement of an inking roller, comprising:

a frame comprising at least a first wall and a second wall arranged opposite one another and defining there-between a chamber by which a cardboard sheet can be transported in an advancement direction, on which cardboard sheet a print is to be made;

a first pair of support elements, which are conformed to be able to restingly receive and support the ends of an inking roller and which are predisposed facing one another on respective internal faces of the first wall and of the second wall, and at a same first height with respect to the ground surface;

at least a second pair of support elements, which are conformed to be able to restingly receive and support the ends of an inking roller and which are predisposed facing one another on respective internal faces of the first wall and of the second wall, and at a second same height with respect to the ground surface that is different from the first height;

a carriage, movable on relative sliding guides, in such a way as to be positionable internally of the chamber, between the first wall and the second wall, and movable out of the chamber, which is conformed in such a way as to have a housing such, when moved and positioned internally of the chamber, as to be able to restingly receive and support the ends of an inking roller;

an automatic system of support and movement of an inking roller comprising:

a first support arm that is fork-shaped so as to have a first seat so as to be able to receive and support a first end of an inking roller, wherein the first support arm is arranged in the chamber in proximity of the first wall;

a second support arm that is fork-shaped so as to have a second seat so as to be able to receive and support a second end of an inking roller, wherein the second support arm is arranged in the chamber in proximity of the second wall;

a first movement group, for the movement of the first support arm;

a second movement group, for the movement of the second support arm;

wherein the first movement group and the second movement group are configured to maintain the first support arm and the second support arm parallel to one another and parallel to the first wall and to the second wall and to move the first support arm and the second support arm in vertical translation and/or in rotation with respect to the first wall and to the second wall so that:

the first support arm and the second support arm can be positioned in a vertical configuration in a raised operating position, at which the first and second support arms can position an inking roller below a print roller and transversally to the advancement direction of a cardboard sheet to be printed which is advancing in the advancement direction through the chamber;

the first support arm and the second support arm can be translated and rotated with respect to the first wall and the second wall in such a way as to be positioned in a first lowered position in which the first and second support arms are positioned at the first pair of support elements so as to be able to release, on the first pair of support elements, an inking roller, or so as to collect from the first pair of support elements an inking roller positioned there and waiting;

the first support arm and the second support arm can be translated and rotated with respect to the first wall and to the second wall in such a way as to be positioned in a second lowered position in which the first and second support arms are positioned at the second pair of support elements so as to be able to release, on the second pair of support elements, an inking roller, or so as to collect from the second pair of support elements an inking roller positioned there and waiting;

the first support arm and the second support arm can be translated and rotated with respect to the first wall and the second wall in such a way as to be positioned in a third lowered position wherein the first and second support arms are positioned at the housing of the carriage positioned in the chamber, so as to be able to release in the housing an inking roller, or so as to collect from the housing of the carriage an inking roller positioned there and waiting.

2. The print station of claim 1, wherein the first wall comprises a first vertical through-slot and the second wall comprises a second vertical through-slot, the first movement group of the first support arm comprising a first drive shaft arranged transversally to the first wall in such a way as to cross the first vertical through-slot and the first support arm being constrained to the first drive shaft, and the second movement group of the second support arm comprising a second drive shaft arranged transversally to the second wall in such a way as to cross the second vertical through-slot and the second support arm being constrained to the second drive shaft, the first drive shaft and the second drive shaft being aligned on a same common axis, wherein the first movement group and the second movement group are configured so as to move the first drive shaft and the second drive shaft in translation along the first vertical through-slot and the second vertical through-slot and/or to activate the first drive shaft and the second drive shaft in rotation about the common axis.

3. The print station of claim 2, wherein the first movement group comprises first driving means of the first drive shaft, so as to drive the first drive shaft in translation along the first vertical through-slot and/or drive the first drive shaft in rotation about the common axis, the first driving means being arranged externally of the chamber and externally of the first wall, and wherein the second movement group comprises second driving means of the second drive shaft, so as to drive the second drive shaft in translation along the second vertical through-slot and/or to drive the second drive shaft in rotation about the common axis, the second driving means being arranged externally of the chamber and externally of the second wall.

4. The print station of claim 3, wherein the first driving means and the second driving means are configured in such a way that each thereof comprises:

a platform translatably mounted on vertical sliding guides;

a first pinion rotatably mounted on the platform, a second pinion rotatably mounted on the platform, the first drive shaft and the second drive shaft being constrained, by an end thereof, to the first pinion and the second pinion;

a first loop-wound chain wound about the first pinion;

a second loop-wound chain wound about the second pinion;

first movement means of the first loop-wound chain;

second movement means of the second loop-wound chain;

the first loop-wound chain and the second loop-wound chain being reciprocally arranged one with respect to another and with respect to the platform in such a way that when:

the first movement means and the second movement means move the first loop-wound chain and the second loop-wound chain in rotation in respective different rotation directions that are opposite one another to drive in rotation the first pinion and the second pinion in opposite rotation directions, the platform is translated along the vertical guides so as to move the first drive shaft and the second drive shaft in translation along the first vertical through-slot and along the second vertical through-slot, and thus vertically translate the first support arm and the second support arm;

the first movement means and the second movement means move the first loop-wound chain and the second loop-wound chain in rotation in respective agreeing rotation directions to drive in rotation the first pinion and the second pinion in agreeing rotation directions, then the first drive shaft and the second drive shaft are driven in rotation about the common rotation axis and thus also the first support arm and the second support arm are driven in rotation;

the first movement means and the second movement means move one of the two loop-wound chains in rotation and maintain the other of the two loop-wound chains stationary, then the platform is translated along the vertical guides so as to move the first drive shaft and the second drive shaft in translation along the first vertical through-slot and the second vertical through-slot and at the same time drive the first drive shaft in rotation and the second drive shaft in rotation about the common rotation axis so that the first support arm and the second support arm are contemporaneously vertically translated and rotated.

5. The print station of claim 4, wherein the first movement means of the first loop-wound chain and the second movement means of the second loop-wound chain are configured in such a way as to be able to contemporaneously drive the first loop-wound chain and the second loop-wound chain both in a same rotation direction and in opposite rotation directions, and able to drive the first loop-wound chain, in a rotation direction or in the other rotation direction, maintaining the second loop-wound chain stationary, and also to be able to drive the second loop-wound chain, in one rotation direction or the other, keeping the first loop-wound chain stationary.

6. The print station of claim 5, wherein the first movement means of the first loop-wound chain comprise, on each of the external faces of the two walls, a first toothed pulley, in a raised position and drivable in rotation by means for a first motor means, and a second toothed pulley, in a lowered position and vertically aligned to the first toothed pulley; a third toothed pulley, rotatably mounted on the platform at a first side of the first pinion and the second pinion in a raised position, and a fourth toothed pulley, rotatably mounted on the platform at a first side of the first pinion and the second pinion in a lowered position and vertically aligned to the third toothed pulley;

the first loop-wound chain being constrained loop-wound about the first, second, third and fourth toothed pulley, wherein the second movement means of the second loop-wound chain comprise, on each of the external faces of the two walls, a fifth toothed pulley, in a raised position and drivable in rotation by means of a second motor means, on an opposite side to the first toothed pulley with respect to the platform, and a sixth toothed pulley, in a lowered position and vertically aligned to the fifth toothed pulley, on an opposite side to the second toothed pulley with respect to the platform; a seventh toothed pulley, rotatably mounted on the platform at a second side of the first pinion and of the second pinion in a raised position on an opposite side with respect to the third toothed pulley, and an eighth toothed pulley, rotatably mounted on the platform at a second side of the first pinion and the second pinion in a lowered position and vertically aligned to the seventh toothed pulley, on an opposite side to the fourth toothed pulley;

the second loop-wound chain being loop-wound about the fifth, sixth, seventh and eighth toothed pulley.

7. The print station of claim 1, wherein the first pair of support elements is arranged on one side of the first vertical through-slot and of the second vertical through-slot, and wherein the second pair of support elements is arranged on the opposite side of the first vertical through-slot and of the second vertical through-slot.

8. The print station of claim 7, wherein the carriage can be movable along the relative sliding guides in such a way as to be positionable internally of the chamber, between the first wall and the second wall, in a position arranged below the first pair of support elements or in a position arranged below the second pair of support elements.

9. The print station of claim 1, comprising a third pair of support elements which are conformed to be able to restingly receive and support the ends of an inking roller and which are predisposed facing one another on respective internal faces of the first wall and of the second wall, and at a same third height with respect to the ground surface, different to the first height, in which the first pair of support elements is arranged, and different to the second height, in which the second pair of support elements is arranged, in a position below the first pair of support elements or in a position below the second pair of support elements, and wherein the first movement group and the second movement group are further configured in order to be able to move the first support arm and the second support arm in vertical translation and/or in rotation with respect to the first wall and to the second wall so that the first support arm and the second support arm can be translated and rotated with respect to the first wall and to the second wall in such a way as to be positioned in a fourth lowered position in which the first and second support arms are positioned at the third pair of support elements so as to be able to release, on the third pair of support elements, an inking roller, or so as to collect from the third pair of support elements an inking roller positioned there and waiting.

* * * * *